No. 877,959. PATENTED FEB. 4, 1908.
G. M. SPENCER.
FLUID PRESSURE BRAKE SYSTEM.
APPLICATION FILED AUG. 3, 1907.
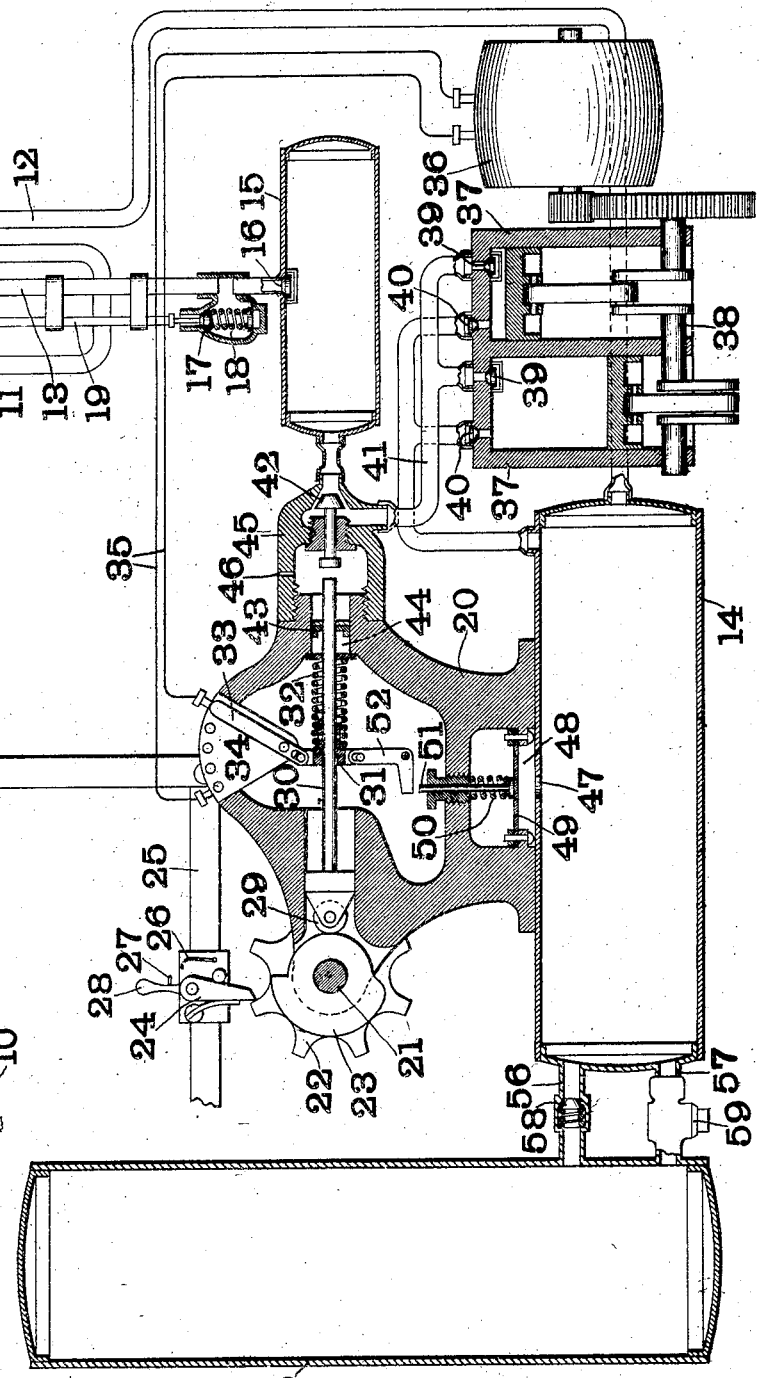
WITNESSES:
L. L. Mead.
W. A. Alexander.
INVENTOR
G. M. Spencer
BY
Foster & Bryson
ATTORNEYS

UNITED STATES PATENT OFFICE.

GEORGE M. SPENCER, OF ST. LOUIS, MISSOURI.

FLUID-PRESSURE BRAKE SYSTEM.

No. 877,959.

Specification of Letters Patent.

Patented Feb. 4, 1908.

Application filed August 3, 1907. Serial No. 386,922.

*To all whom it may concern:*

Be it known that I, GEORGE M. SPENCER, a citizen of the United States, residing at St. Louis, in the State of Missouri, have invented a certain new and useful Fluid-Pressure Brake System, of which the following is such a full, clear, and exact description as will enable any one skilled in the art to which it appertains to make and use the same, reference being had to the accompanying drawings, forming part of this specification.

My invention relates to a fluid pressure brake system and is particularly adapted for use upon a street railway car.

One object of my invention is to provide means for utilizing a portion of the air, or other fluid for actuating the brake cylinder so as to not only save the power represented by the compression of such air, but also to enable the pump to be started under light load, thus preventing injury both to the pump and the motor for driving the same.

Another object of my invention is to provide means independent of the air pressure in the supply tank for insuring a period of rest to the pump and driving motor.

Still another object of my invention is to provide a reserve supply of air which may be used at times when the pump is out of operation.

In the accompanying drawings which illustrate one form of brake system made in accordance with my invention, Figure 1 is a diagrammatic view, partly in section, and Fig. 2 is a detailed view of the controlling valve.

Like marks of reference refer to similar parts in both views of the drawings.

5 represents the brake cylinder, which is of the usual form. The piston rod of the brake cylinder 5 is pivoted at 6 to the brake lever 7. Extending from the brake cylinder 5 to the controlling valve 8 is a pipe 9 which serves both as a supply and a discharge passage for the brake cylinder 5. The valve 8 is operated by means of a handle 10 provided with a movable portion 11 for purposes to be hereinafter described. In addition to the pipe 9, the valve 8 is provided with two other pipes 12 and 13 respectively. The pipe 12 extends from the valve 8 to the supply tank 14 and the pipe 13 extends from the valve 8 to the equalizing tank 15. A check valve 16 prevents the return of air from the equalizing tank 15 to the valve 8. The pipe 13 is also provided with a discharge valve 17 normally held in position by means of a coil spring 18. The valve 17 is provided with an upwardly extending stem 19, which is adapted to be operated by the movable member 11 on the handle 10.

In operating the brake the valve 8 is first moved by means of the handle 10 into position to put the brake cylinder 5 into communication with the supply tank 14, so as to apply the brake. If it is desired to release the brake, the valve is moved into a position to place the cylinder 5 into communication with the equalizing tank 15. The pressure will now become equalized in the cylinder 5 and tank 15, after which the movable member 11 on the handle 10 is operated so as to depress the stem 19 and open the valve 17 so that the remaining air in the cylinder 5 is discharged into the atmosphere. The valve 16 prevents the escape of the air from the tank 15.

Mounted on the supply tank is a casing 20. This casing 20 has mounted in it a shaft 21 carrying a ratchet wheel 22 and a cam 23. The ratchet wheel 22 is adapted to be operated by means of the pawl 24 pivoted on an arm 25 carried by the brake lever 7. This pawl 24 normally engages the ratchet wheel 22 at each operation of the brake cylinder so as to move the said wheel forward one tooth. The pawl 24, however, may be held out of operation by means of a hook 26 adapted to engage with an eye 27 carried on a handle 28 which is supplied for manually moving the pawl 24. The cam 23 bears upon a roller 29 mounted on the end of a rod 30 adapted to slide longitudinally in the casing 20. This rod 30 has rigidly secured to it a collar 31. Bearing on the collar 31 is a coil spring 32 which holds the roller 29 in contact with the face of the cam 23. The collar 31 also engages with one end of a lever 33 of the circuit controller 34. This circuit controller 34 is connected by means of wires 35 with the motor 36 which drives the pumps 37. The pumps 37 are two in number and are connected to the crank shaft 38 at a distance of 180° apart, so that when the piston of one pump is ascending the other is descending. Each of the pumps 37 is provided with an intake valve 39 and a discharge valve 40. The intake valves 39 are connected by means of a pipe 41 with the equalizing tank 15 hereinbefore described. The pipe 41, however, in place of being directly connected with the tank 15 is connected with said tank through a valve 42, which valve is adapted to be closed by means of the longitudinally movable rod 30 hereinbefore described. This rod 30 is provided with a cup leather 43 working in a cylindrical bore 44 in the casing 20 so as to form a dash pot. The extension 45 of the casing 20 carrying the valve 42 communicates with the end of this bore 44 and is provided with a small opening 46 supplying the air to the dash pot and thus regulating the rapidity of the return of the rod 30.

In addition to the cam 23, the rod 30 is adapted to be operated by the pressure of the air in the supply tank 14. In order to accomplish this, the supply tank 14 is provided with an outlet 47 communicating with a short cylindrical opening 48 in the base of the casing 20. This cylindrical portion 48 is provided with a diaphragm 49 held against the pressure of the air by means of a coil spring 50 and provided with a stem 51 adapted to strike against one arm of a bell crank lever 52, the opposite arm of which engages with the collar 31 on the rod 30 so that when the pressure in the tank 14 becomes sufficient to overcome the tension of the spring 50, the bell crank lever 52 will be operated to move the rod 30 longitudinally.

In addition to the supply tank 14, I provide a storage tank 55. This storage tank 55 is connected with the supply tank 14 by two pipes 56 and 57 respectively. Situated in the pipe 56 is a check valve 58 adapted to allow the passage of air from the supply tank 14 into the storage tank 55 whenever the pressure in the supply tank 14 rises above that in the storage tank 55. The valve, however, prevents any return of pressure from the storage tank into the supply tank without regard to any relative difference in the pressures in the two tanks. The pipe 57 is provided with a reducing valve 59. This reducing valve 59 normally prevents communication between the two tanks, but is so arranged that when the tank 14 becomes nearly empty and the consequent difference in the pressure between the two tanks is sufficiently great it will allow the air from the storage tank 55 to pass into the supply tank 14.

In the operation of the device, as has been above described, the air from the brake cylinder 5 is discharged into the equalizing tank 15 so that a portion of the compressed air is saved for reuse, being pumped out of the equalizing tank 15 and into the supply tank 14 by the pump 37. This action will take place whenever the parts are in the position shown in Fig. 1 of the drawings. When, however, the pressure in the tank 14 becomes sufficient to overcome the resistance of the spring 50, the rod 31 will be moved by means of the bell crank lever 52 so as to swing the controller arm 33 on its pivot and thus cut off the supply of electricity from the motor 36 and at the same time close the valve 42. The object of closing the valve 42 is to prevent leakage of the air from the equalizing tank 15, as it is practically impossible to make the pump cylinders 37 absolutely air tight. In addition to the means for cutting off the supply from the motor 36 above described, the action of the brake cylinder 5 moves the ratchet wheel 22 forward one tooth each time the brake is operated, so after a given number of operations of the brake cylinder, the enlarged portion of the cam 23 will come in contact with the roller 29 and thus actuate the rod 30 and consequently cut off the current from the motor 26 and close the valve 42. The operation of the motor will thus be prevented until the brake has been operated a sufficient number of times to move the enlarged portion of the cam 23 out of contact with the roller 29 and thus allow the stem 30 to return to its initial position under the pressure of the spring 32. The dash pot formed by the cup leather 43 working in the bore 44 compels the gradual return of the rod 30 to its normal position so that the motor 36 is cut into operation gradually.

It will be evident that from the arrangement of my system a portion of the air which is lost by being vented into the atmosphere in the ordinary system is used in my system so as not only to prevent a waste of power but to enable the pumps to start up under a light load, thus preventing damage to the pumps and the motor driving the same, and that, furthermore, a predetermined period of rest is forced upon the pumps without regard to the amount of air used or to any leakage which may occur in the pipes. This predetermined period of rest prevents the pumps from being burned out by continual use. In the ordinary brake system this is very likely to happen when a serious leak occurs in any of the pipe connections. In case a leak occurs in my brake mechanism, the continual operation of the pumps is avoided so that there is no danger of injury to the pumps. If such leak is serious, the cam 23 may be moved into position to throw the pump out of operation and the pawl 24 may then be held out of operative position by means of the hook 26 so that the pump is entirely thrown out of operation, in which case the remainder of the run may be completed with the air in the reserve or storage tank 55. In case the pumps are in operation after all the compressed air has been pumped out of the equalizing tank 15 it is evident that the air from the atmosphere may enter the tank through the valves 16 and 17, as both these valves open inwardly. This will allow the air to freely enter the tank 15 from which it may always pass to the pumps when they are in operation, the valves 42 being always open when the pumps are in operation.

Having fully described my invention, what I claim as new and desire to secure by Letters Patent of the United States is:

1. In a fluid pressure brake system, the combination with a brake cylinder, of an operative supply therefor, a generator connected with said supply, an equalizing tank into which said brake cylinder is adapted to discharge, a check valve for preventing the return of air from said equalizing tank, and connections between said equalizing tank and generator.

2. In a fluid pressure brake system, the combination with a brake cylinder, of an operative supply therefor, a generator connected with said supply, an equalizing tank, connections between said brake cylinder and equalizing tank, said connections being provided with a vent to the atmosphere, and connections between said equalizing tank and brake generator.

3. In a fluid pressure brake system, the combination with a brake cylinder, of an operative supply therefor, a generator connected with said supply, an equalizing tank, connections between said brake cylinder and equalizing tank, said connections being provided with a manually operated vent to the atmosphere, and connections between said equalizing tank and brake generator.

4. In a fluid pressure brake system, the combination with a brake cylinder, of a supply tank therefor, an equalizing tank, a valve adapted to place said brake cylinder in connection with either said supply tank or equalizing tank, a manually controlled vent from said cylinder to the atmosphere, and a generator connected with said equalizing and supply tank.

5. In a fluid pressure brake system, the combination with a brake cylinder, of a supply tank therefor, an equalizing tank, a valve adapted to place said brake cylinder in connection with either said equalizing or supply tank, a vent to the atmosphere adapted to be operated by the movement of said valve, and a generator connected with said equalizing and supply tanks.

6. In a fluid pressure brake system, the combination with a brake cylinder, of an operative supply therefor, a generator connected with said supply, an equalizing tank into which said brake cylinder is adapted to discharge, a passage connecting said equalizing tank and generator, and means for closing said passage.

7. In a fluid pressure brake system, the combination with a brake cylinder, of an operative supply therefor, a generator connected with said supply, an equalizing tank into which said brake cylinder is adapted to discharge, a passage connecting said equalizing tank and generator, and means controlled by the operation of the brake cylinder for closing said passage.

8. In a fluid pressure brake system, the combination with a brake cylinder, of an operative supply therefor, a generator connected with said supply, an equalizing tank into which said brake cylinder is adapted to discharge, a passage connecting said equalizing tank with the generator, and means operated by the pressure of said supply for closing said passage.

9. In a fluid pressure brake system, the combination with a brake cylinder, of an operative supply therefor, a generator connected with said supply, an equalizing tank into which said brake cylinder is adapted to discharge, a passage connecting said equalizing tank and generator, and means operated by the brake cylinder for closing said passage, said means also being independently operated by the pressure of said supply.

10. In a fluid pressure brake system, the combination with a brake cylinder, of an operative supply therefor, a generator connected with said supply, means for operating said generator, and a controlling device for said operating means actuated by the brake cylinder, said controlling device also being actuated by the pressure of said supply.

11. In a fluid pressure brake system, the combination with a brake cylinder, of an operative supply therefor, a generator connected with said supply, operative means for said generator, an equalizing tank into which said brake cylinder is adapted to discharge, a passage connecting said equalizing tank and generator, and means for controlling said operative means and closing said passage.

12. In a fluid pressure brake system, the combination with a brake cylinder, of an operative supply therefor, a generator connected with said supply, operative means for said generator, an equalizing tank into which said brake cylinder is adapted to discharge, a passage connecting said equalizing tank and generator, and means operated by the brake cylinder for controlling said operative means and closing said passage.

13. In a fluid pressure brake system, the combination with a brake cylinder, of an operative supply therefor, a generator connected with said supply, operative means for said generator, an equalizing tank into which said brake cylinder is adapted to discharge, a passage connecting said equalizing tank and said generator, and means operated by the pressure of said supply for controlling said operative means and closing said passage.

14. In a fluid pressure brake system, the combination with a brake cylinder, of an operative supply therefor, a generator connected with said supply, operative means for said generator, an equalizing tank into which said brake cylinder is adapted to discharge, a passage connecting said equalizing tank and generator, and means operated by the brake cylinder and independently by the pressure of the supply for controlling said operative means and closing said passage.

15. In a fluid pressure brake system, the combination with a brake cylinder, of a supply tank therefor, a generator connected with said supply tank, a storage tank, a check valve permitting the passage of fluid from said supply tank to said storage tank, and a reducing valve permitting the flow of fluid from said storage tank to said supply tank.

16. In a fluid pressure brake system, the combination with a brake cylinder, of a supply tank therefor, a generator connected with said supply tank, actuating means for said generator, a storage tank, a check valve between said supply tank and storage tank, a reducing valve between said supply tank and storage tank, and a controlling device operated by the pressure in said supply tank for said actuating means.

17. In a fluid pressure brake system, the combination with a brake cylinder, of a supply tank therefor, a generator connected with said supply tank, actuating means for said generator, a storage tank, a check valve between said supply and storage tanks, a reducing valve between said supply and storage tanks, and a controlling device operated by the brake cylinder for said actuating means.

18. In a fluid pressure brake system, the combination with a brake cylinder, of a supply tank therefor, a generator connected with said supply tank, a storage tank, a check valve between said supply and storage tanks and opening into the latter, a reducing valve between said supply and storage tanks and opening into the former, an equalizing tank into which said brake cylinder is adapted to discharge, said equalizing tank being connected to said generator, and means controlled by the movement of the brake cylinder for cutting said generator out of operation.

19. In a fluid pressure brake system, the combination with a brake cylinder, of a supply tank therefor, a generator connected with said supply tank, a storage tank, a check valve, a reducing valve between said supply and storage tanks, an equalizing tank into which said brake cylinder is adapted to discharge, and means controlled by the brake cylinder for cutting said generator out of operation, said means being also controlled by the pressure in the supply tank.

20. In a fluid pressure brake system, the combination with a brake cylinder, of a supply tank therefor, a generator connected with said supply tank, a storage tank, check and reducing valves between said supply and storage tanks, an equalizing tank into which said brake cylinder is adapted to discharge, said generator being connected with said equalizing tank, a valve in said latter connections, a movable member controlling said valve and the operation of said generator, a cam for actuating said movable member, and means for actuating said cam.

21. In a fluid pressure brake system, the combination with a brake cylinder, of a supply tank therefor, a generator connected with said supply tank, a storage tank, check and reducing valves between said supply and storage tanks, an equalizing tank into which said brake cylinder is adapted to discharge, said generator being connected with said equalizing tank, a valve in said latter connection, a movable member controlling said valve and the operation of said generator, a cam for actuating said movable member, and means operated by the brake cylinder for actuating said cam.

22. In a fluid pressure brake system, the combination with a brake cylinder, of a supply tank therefor, a generator connected with said supply tank, a storage tank, check and reducing valves between said supply and storage tanks, an equalizing tank into which said brake cylinder is adapted to discharge, said generator being connected with said equalizing tank, a valve in said latter connection, a movable member controlling said valve and the operation of said generator, a cam for actuating said movable member, means for actuating said cam, and means for throwing said latter device out of operation.

23. In a fluid pressure brake system, the combination with a brake cylinder, of a supply tank therefor, an equalizing tank into which said brake cylinder is adapted to discharge, a generator connected with said equalizing tank, a valve in said connection, a member adapted to actuate said valve, an electric controller actuated by said member, a cam for operating said member, a ratchet wheel connected with said cam, and means for actuating said ratchet wheel.

24. In a fluid pressure brake system, the combination with a brake cylinder, of a supply tank therefor, an equalizing tank into which said brake cylinder is adapted to discharge, a generator connected with said equalizing tank, a valve in said connection, a member adapted to actuate said valve, an electric controller actuated by said member, a cam for operating said member, a ratchet wheel connected with said cam, and means operated by the brake cylinder for operating said ratchet wheel.

25. In a fluid pressure brake system, the combination with a brake cylinder, of an operative supply therefor, a generator connected with said supply, and means for automatically cutting said generator out of operation, said means holding said generator out of operation for a period of rest independently of the pressure in said supply.

26. In a fluid pressure brake system, the combination with a brake cylinder, of an equalizing tank into which said brake cylinder is adapted to discharge, an operative supply for the said brake cylinder, a generator connected with said equalizing tank and supply, and means for automatically cutting said generator out of operation, said means holding said generator out of operation for a period of rest independently of the pressure in said supply.

27. In a fluid pressure brake system, the combination with a brake cylinder, of an operative supply therefor, a storage tank connected with said supply, a generator connected with said supply, means for automatically cutting said generator out of operation, said means holding said generator out of operation for a period of rest independently of the pressure in the said supply.

28. In a fluid pressure brake system, the combination with a brake cylinder, of an operative supply therefor, a generator connected with said supply, a controller for said generator, means for actuating said controller to cut said generator out of operation, said means retaining said controller to hold said generator out of operation for a period of rest independently of the pressure in said supply, and means for retarding the return of said controller.

29. In a fluid pressure brake system, the combination with a brake cylinder, of an equalizing tank into which said brake cylinder is adapted to discharge, a supply for said brake cylinder, a generator connected with said equalizing tank and said supply, a controller for said generator, means for actuating said controller to cut said generator out of operation, said means retaining said controller to hold said generator out of operation for a period of rest independently of the pressure in said supply, and means for retarding the return of said controller.

30. In a fluid pressure brake system, the combination with a brake cylinder, of an operative supply therefor, a storage tank connected with said supply, a generator connected with said supply, a controller for said generator, means for actuating said controller to cut said generator out of operation, said means retaining said controller to hold said generator out of operation for a period of rest independently of the pressure in said supply, and means for retarding the return of said controller.

In testimony whereof, I have hereunto set my hand and affixed my seal in the presence of the two subscribing witnesses.

GEORGE M. SPENCER. [L. S.]

Witnesses:
W. A. ALEXANDER,
ELIZABETH BAILEY.